Patented Nov. 9, 1948

2,453,194

UNITED STATES PATENT OFFICE 2,453,194

LIGHT POLARIZING HEADLIGHT LAMINATION

Harold O. Buzzell, Wollaston, Mass., assignor to Polaroid Corporation, Cambridge, Mass., a corporation of Delaware Application March 7, 1946, Serial No. 652,654

3 Claims. (Cl. 240—9.5)

This invention relates to light-polarizing headlights for automotive vehicles and the like.

It is an object of the invention to provide a light-polarizing headlight of the so-called "sealed-beam" type having a substantially flat, multilayer lamination of light-polarizing material and suitable protective layers bonded to its outer light-emitting face.

It is a further object of the invention to provide, in a headlight of the character described, an adhesive layer between the light-polarizing lamination and the outer surface of the headlight lens of such a character as to reduce to a minimum the formation of bubbles within that portion of the adhesive forming the bond which is subjected to maximum heat from the filament of the headlight in use.

A further object of the invention is to form a light-polarizing lamination on the outer surface of headlight lenses of such character as to cushion the various elements against injury due to shocks and blows such as may be experienced during usual use.

Accordingly, it is a specific object of the invention to provide in a polarizing headlight of the character described an adhesive layer of a polymerized, synthetic plastic material bonding the polarizing lamination to the outer surface of the headlight lens, said adhesive layer being of substantially greater thickness at its center than in the area adjacent its edges.

Other objects of the invention will in part be obvious and will in part appear hereinafter.

The invention accordingly comprises the article possessing the features, properties and the relation of elements which are exemplified in the following detailed disclosure, and the scope of the application of which will be indicated in the claims.

For a fuller understanding of the nature and objects of the invention, reference should be had to the following detailed description, taken in connection with the accompanying drawing, wherein.

The so-called "sealed-beam" headlight has been widely adopted as standard equipment for automotive vehicles. It comprises a filament 12 of any suitable type suitably positioned within a reflector 14, which is hermetically sealed to a glass lens element 15 provided on its inner surface with suitable lenticles 16. Headlights of this type as first produced embodied a convex, spherically curved lens element which created substantial problems in connection with the application to the outer surface thereof of light-polarizing material. It was, for example, extremely difficult, if not impossible, to satisfactorily bond to the spherical surface of such headlights a preformed sheet of light-polarizing material of any of the types commercially available at the time the headlights were introduced in the market. It has recently been suggested that the shape of the sealed-beam headlight be modified so that the outer surface of the lens element 15 thereof is substantially flat and planar. This invention is concerned primarily with the solution of problems arising from the bonding to the outer surface of the lens element of the new, modified form of sealed-beam headlight of a lamination comprising a light-polarizing element.

The light polarizers employed in connection with the present invention may comprise any suitable material such, for example, as any of the sheet-like polarizing materials sold under the trade name "Polaroid," and, more specifically, the material described in the patent to Land and Rogers No. 2,173,304, issued September 19, 1939, for Light polarizer, i. e., a sheet of molecularly oriented polyvinyl alcohol which has been subjected to treatment converting certain of its molecules, for example by dehydration, into molecules of a light-polarizing substance which has become known as polyvinylene.

Figure 2:
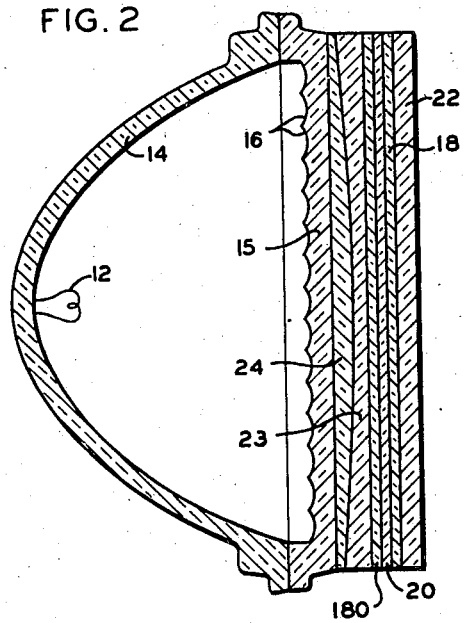
Fig. 2 is a similar view of a modification of the invention.
Figure 3:
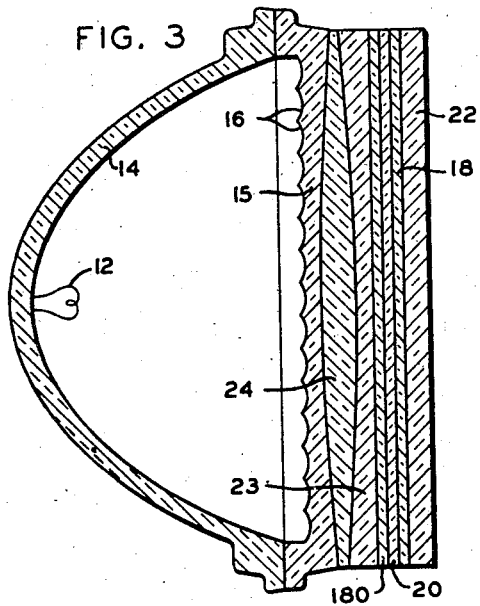
Fig. 3 is a similar view of a still further modification of the invention.

In the drawings, wherein like elements are similarly numbered throughout, 20 illustrates the light-polarizing sheet or film. This sheet is preferably bonded to an outer, rigid, impact-resistant, light-transmitting layer, for example, of glass or some suitable hard, polymerized resin 22, by means of a suitable adhesive 18, for example an incomplete polyvinyl acetal such as polyvinyl butyral. Under certain circumstances the outer abrasion-resistant layer 22 may be scored, for example by fine, radially-extending score lines, not shown, to prevent the setting up of photo-elastic strain patterns therein when the headlight is in use. Where the outer layer is so scored it may be desirable to provide a rigid, transparent supporting layer intermediate the polarizing layer 20 and the lens 15. Such a supporting layer is shown in Figs. 2 and 3 at 23, and the polarizing film may be bonded thereto by a second layer of adhesive 180 similar to that bonding the polarizing layer to the outer abrasion-resistant element. The intermediate rigid support 23 may comprise glass of any suitable hard, substantially rigid, light-transmitting plastic material.

Figure 1:
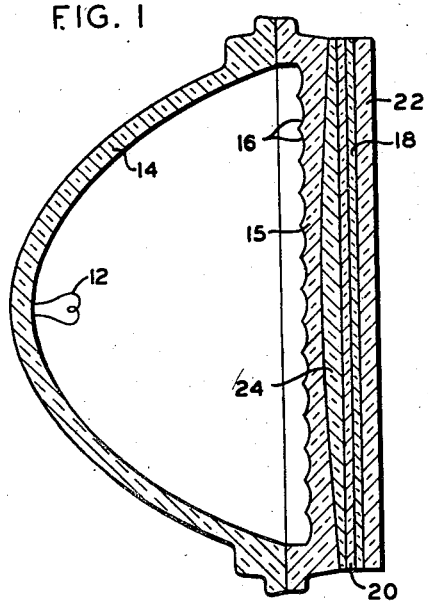
Figure 1 represents, somewhat diagrammatically and with element sizes distorted, a vertical section of a headlight of the character described, having bonded thereto a lamination of light-polarizing material and is illustrative of one embodiment of the invention.

When either the three-ply lamination of Fig. 1 comprising the polarizing layer 20, the adhesive layer 18, and the outer abrasion-resistant layer 22, or the five-ply laminations of Figs. 2 and 3 comprising, in addition to the three elements mentioned, the rigid, inner, supporting layer 23 and the adhesive layer 180 intermediate said layer and the polarizing layer, is bonded to the outer surface of the lens element 15, the bond should be accomplished by an adhesive layer 24 which is appreciably thicker in its central portion than adjacent its edge portion. This may be accomplished, as shown in Fig. 1, by making the outer surface of the lens element 15 of the headlight appreciably concave, or, as shown in Fig. 2, by making the outer surface of the inner supporting element 23 of the polarizing lamination appreciably concave, or as shown in Fig. 3 by making the adjacent surfaces of the lens element 15 and the supporting element 23 each appreciably concave. With any of the structures shown, there is provided a headlight having bonded to its outer surface a light-polarizing lamination, the adhesive layer between the headlight lens and the polarizing lamination being appreciably thicker adjacent the central portion thereof than adjacent the edge portion. A suitable adhesive for use in effecting the bond between the polarizing lamination and the outer surface of the glass lens element 15 may comprise one or more acrylic or methacrylic compounds such, for example, as a copolymer of butyl methacrylate and methacrylic acid in proportions of approximately 95 parts of the former to 5 parts of the latter. Such an adhesive may be applied between the surfaces to be bonded together in partially polymerized form and the polymerization of the adhesive layer may then be carried forward to substantial completion by heat. Another adhesive that has been found to serve admirably, is a mixture of 200 parts by weight of castor oil, and 80 parts by weight of polyvinyl butyral.

The structures shown in the drawing as providing adhesive layers, between the polarizing lamination and the outer surface of the glass lens of the headlight, of greater thickness in their central portions, are advantageous in that they reduce to a minimum the tendency of bubbles to form in the adhesive layer during operation of the headlight by reason of the heat emitted from the filament of the lamp which is most intense over the central area of the lens surface. A relatively thick adhesive layer over this central area has been found to result in the formation of few, if any, bubbles and such a result is, of course, to be desired as the formation of bubbles alters the effect of the lenticles 16. A suitable thickness for the adhesive layer 24 to accomplish the objects of the invention in structures, such as are shown in the drawing, is approximately 0.001 to 0.010 inch adjacent its edge portion and approximately 0.025 to 0.050 inch thicker adjacent its central portion.

A further distinct advantage to the thicker centered layer 24 of adhesive, is its desirable cushioning effect against shock and impact due to blows and jarring. Rigorous treatment of the finished article, as may well occur in regular usage, such as to crack or break or otherwise injure the various laminations and the lens, in the absence of the centrally located thickened portion of layer 24, is suffered without any harm whatsoever, when this centrally thickened layer 24 is present. The cushioning effect of this thickened layer 24 is thus a most desirable feature in furthering the useful life and the efficiency of the thus equipped headlight.

Since certain modifications in the article which embody the invention may be made without departing from its scope, it is intended that all matter contained in the above description, or shown in the accompanying drawing, shall be interpreted as illustrative and not in a limiting sense.

What is claimed is:

1. In a light-polarizing automobile headlight wherein a substantially flat, planar lamination of a light-polarizing sheet to an abrasive-resistant cover plate is bonded to the outer surface of a substantially flat lens element so positioned with respect to a filament light source as to subject the adhesive comprising said bond to relatively intense heat when the filament is energized, an adhesive layer bonding the inner surface of said lamination to the outer surface of said lens, at least one of said surfaces being continuously concave, said adhesive layer being appreciably thicker throughout that portion thereof which overlies the central portion of the lens element than portions adjacent the periphery thereof.

2. The improvement set forth in the preceding claim wherein the outer surface of the substantially flat lens element is concave.

3. The improvement set forth in claim 1 wherein the central portion of said adhesive layer is at least twice as thick as the peripheral portion thereof.

HAROLD O. BUZZELL.

REFERENCES CITED

The following references are of record in the file of this patent:

UNITED STATES PATENTS

| Number | Name | Date |
|---|---|---|
| 1,692,619 | Brown | Nov. 20, 1928 |
| 2,092,789 | Tillyer | Sept. 14, 1937 |
| 2,168,221 | Land | Aug. 1, 1939 |
| 2,180,114 | Land | Nov. 14, 1939 |
| 2,237,565 | Land | Apr. 8, 1941 |
| 2,244,702 | Hubbuch | June 10, 1941 |
| 2,252,324 | Land | Aug. 12, 1941 |
| 2,320,375 | Moulton | June 1, 1943 |
| 2,356,250 | Land | Aug. 22, 1944 |
| 2,370,697 | Tillyer | Mar. 6, 1945 |

FOREIGN PATENTS

| Number | Country | Date |
|---|---|---|
| 460,666 | Great Britain | Jan. 28, 1937 |
| 539,135 | Great Britain | Aug. 28, 1941 |